US011084475B2

(12) United States Patent
Anderson et al.

(10) Patent No.: US 11,084,475 B2
(45) Date of Patent: Aug. 10, 2021

(54) MASTER BRAKE CYLINDER, BRAKING SYSTEM

(71) Applicant: Robert Bosch GmbH, Stuttgart (DE)

(72) Inventors: Chris Anderson, Paris (FR); Dirk Foerch, Neuenstadt/Stein (DE); Florent Yvonet, Trilport (FR); Raynald Sprocq, Esbly (FR); Simon Hansmann, Plymouth, MI (US); Matthias Kistner, Bretzfeld (DE)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 16/464,997

(22) PCT Filed: Oct. 5, 2017

(86) PCT No.: PCT/EP2017/075310
§ 371 (c)(1),
(2) Date: May 29, 2019

(87) PCT Pub. No.: WO2018/099634
PCT Pub. Date: Jun. 7, 2018

(65) Prior Publication Data
US 2019/0291704 A1    Sep. 26, 2019

(30) Foreign Application Priority Data

Nov. 30, 2016 (DE) .......................... 102016223758.6

(51) Int. Cl.
*B60T 11/236* (2006.01)
*F15B 7/08* (2006.01)
(Continued)

(52) U.S. Cl.
CPC ........... *B60T 11/236* (2013.01); *B60T 13/142* (2013.01); *F15B 7/08* (2013.01); *F15B 15/1452* (2013.01);
(Continued)

(58) Field of Classification Search
CPC .... B60T 11/236; B60T 13/145; B60T 13/148; B60T 13/142; B60T 13/144; F15B 7/08;
(Continued)

(56) References Cited

U.S. PATENT DOCUMENTS 3,946,564 A * 3/1976 Nakagawa ............ B60T 13/144
60/548
4,492,082 A * 1/1985 Belart .................... B60T 11/165
60/589

(Continued)

FOREIGN PATENT DOCUMENTS

DE           3031012 A1 *  7/1981 ............ B60T 11/236
DE          10231952 B4 *  7/2007 ............ B60T 13/142
(Continued)

OTHER PUBLICATIONS

EPO translation, DE 3031012 A1. (Year: 1981).*
International Search Report for PCT/EP2017/075310, dated Feb. 1, 2018.

*Primary Examiner* — Thomas J Williams
(74) *Attorney, Agent, or Firm* — Norton Rose Fulbright US LLP; Gerard Messina

(57) ABSTRACT

A master brake cylinder is described for a brake system of a motor vehicle as having a hydraulic cylinder that has a plurality of hydraulic connections, in which at least one hydraulic piston is mounted so as to be displaceable axially in a direction of actuation and in a relief direction, the hydraulic piston being displaceable against the force of a spring element in the direction of actuation, the hydraulic piston having at least one lateral wall opening that, in at least one sliding position, opens into an inner chamber of the hydraulic cylinder. It is provided that the lateral wall opening is assigned an elastically deformable sealing ring that on its inner side is fastened on the hydraulic piston and on its outer side is pre-loaded against the hydraulic cylinder by its (Continued)

inherent elasticity and is shaped such that when the hydraulic piston is displaced in the direction of actuation it detaches from the hydraulic cylinder, and when the hydraulic piston is displaced in the relief direction it bears on the hydraulic cylinder.

16 Claims, 2 Drawing Sheets

(51) Int. Cl.
    *F16J 15/3284*     (2016.01)
    *B60T 13/14*     (2006.01)
    *F16J 15/3236*     (2016.01)
    *F15B 15/14*     (2006.01)

(52) U.S. Cl.
    CPC ....... *F16J 15/3236* (2013.01); *F16J 15/3284* (2013.01); *B60T 13/145* (2013.01)

(58) Field of Classification Search
    CPC .......... F15B 15/1452; F16J 15/3236; F16J 15/3232; F16J 15/3284
    USPC .......................................................... 60/588
    See application file for complete search history.

(56) References Cited

U.S. PATENT DOCUMENTS

| | | | |
|---|---|---|---|
| 4,579,041 A * | 4/1986 | Organ | A63H 33/042 137/854 |
| 4,834,467 A * | 5/1989 | Zirps | B60T 8/446 303/114.1 |
| 5,328,178 A * | 7/1994 | Nies | B60T 11/236 277/438 |
| 7,386,979 B2 * | 6/2008 | Tsubouchi | B60T 11/16 60/588 |
| 9,321,436 B2 * | 4/2016 | Schiel | B60T 7/042 |
| 2011/0308247 A1 * | 12/2011 | Wasson | B60T 11/236 60/587 |

FOREIGN PATENT DOCUMENTS

| | | | |
|---|---|---|---|
| DE | 112013005217 T5 | 8/2015 | |
| EP | 1637746 A2 | 3/2006 | |
| GB | 2027845 A | 2/1980 | |
| WO | WO-9215474 A1 * | 9/1992 | ............ B60T 11/236 |

* cited by examiner

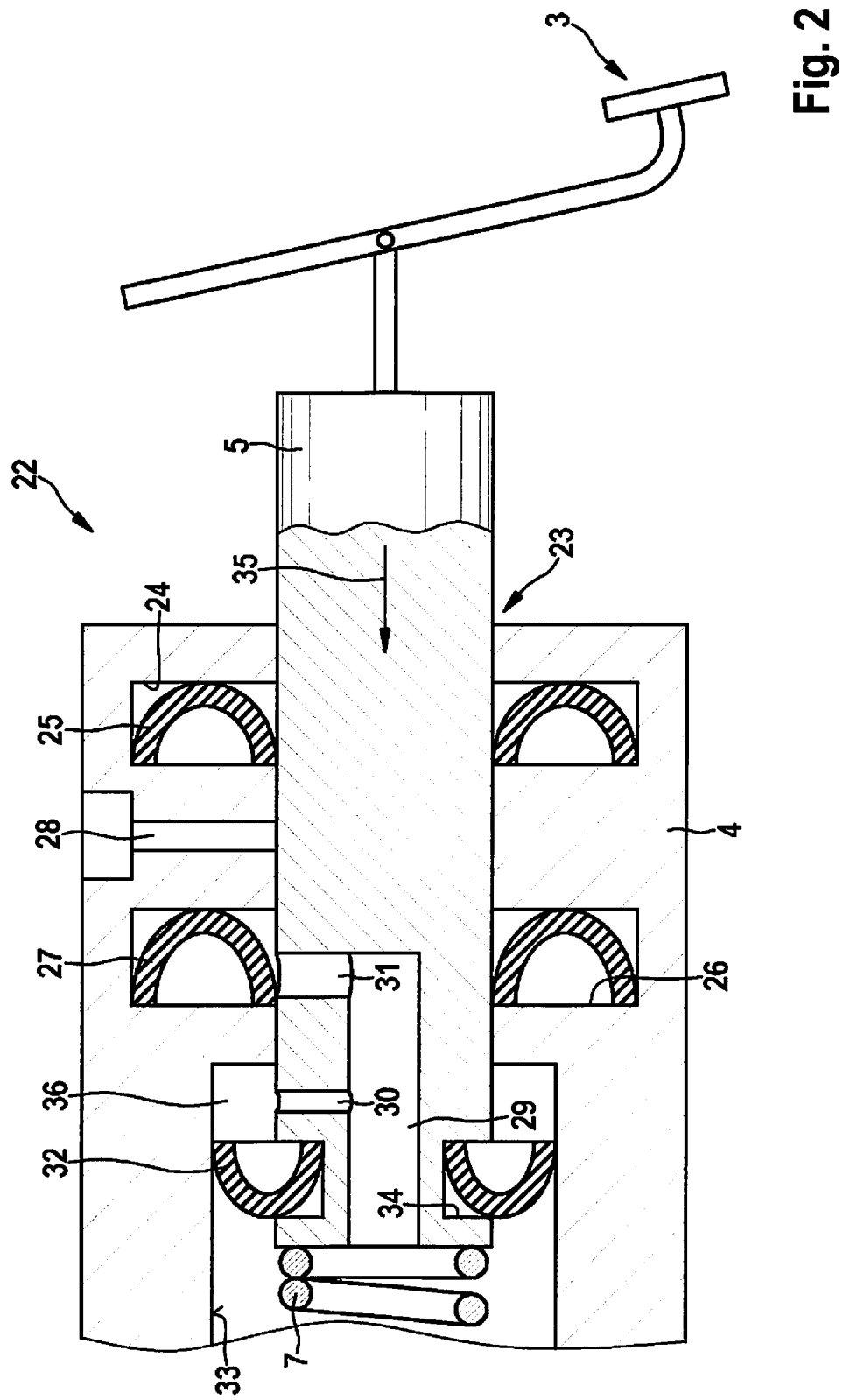

MASTER BRAKE CYLINDER, BRAKING SYSTEM

FIELD OF THE INVENTION

The present invention relates to a master brake cylinder for a brake system of a motor vehicle, having a hydraulic cylinder that has a plurality of hydraulic connections, in which cylinder at least one hydraulic piston is mounted so as to be displaceable axially in a direction of actuation and in a relief direction, the hydraulic piston being displaceable in the direction of actuation against the force of a spring element, and the hydraulic piston having at least one lateral wall opening that, in at least one sliding position, opens into an inner chamber of the hydraulic cylinder.

In addition, the present invention relates to a brake system for a motor vehicle having a master brake cylinder that is connected to at least one hydraulic circuit that has at least one hydraulically actuatable wheel brake.

BACKGROUND INFORMATION

Master brake cylinders and brake systems of the type named above are known from the existing art. In order to convert the actuating force exerted on a brake pedal by a driver into a hydraulic pressure for actuating hydraulic wheel brakes, it is known to mechanically connect the brake pedal to a hydraulic piston that is mounted in axially displaceable fashion in the hydraulic cylinder. When the driver actuates the brake pedal, the hydraulic piston is displaced against the force of a spring element so that the spring element is preloaded, or additionally preloaded. Through the displacement of the hydraulic piston in the hydraulic cylinder, a volume in the inner chamber of the hydraulic cylinder is made smaller, placing a fluid situated therein under pressure and impelling it out of the master cylinder through at least one of the hydraulic connections in order to actuate at least one of the wheel brakes. When the driver removes his foot from the brake pedal, then the loaded spring element, due to its inherent elasticity, presses the hydraulic piston back into its initial position, hydraulic medium simultaneously moving into the master cylinder through one of the hydraulic connections, so that subsequently the master brake cylinder is then available and is prepared for a further braking process.

If a tie is allocated to the spring element, this tie mechanically limits the maximum relaxation of the spring element when the hydraulic piston is relieved by the driver.

Instead of a tie, it is also known to realize a damping of movement of the hydraulic piston by fashioning a damping chamber between the hydraulic piston and a hydraulic cylinder that becomes smaller when there is a movement of the hydraulic piston in the relief direction, and that is fluidically connected to the inner chamber of the hydraulic system through a lateral wall opening in the hydraulic piston. The fluid in the damping chamber can escape slowly through a provided leakage opening, the damping effect of the damping chamber being determined by the cross-section of the leakage opening, and the maximum speed of movement of the hydraulic piston being limited thereby.

However, the provision of the damping chamber requires additional constructive space, and, in particular given realization of the master brake cylinder as a tandem cylinder, the realization of the damping chamber requires an additional sleeve that makes installation more difficult and increases the production costs.

SUMMARY

The master brake cylinder according to the present invention has the advantage that the damper is realized in a particularly simple and low-cost manner, and can be realized even when the master brake cylinder is realized as a tandem cylinder. Here, the constructive space required for the master brake cylinder is not expanded, or is expanded only slightly. According to the present invention, this is achieved in that the lateral wall opening is provided with an elastically deformable sealing ring whose inner side is fastened on the hydraulic piston, and whose outer side is preloaded against the hydraulic cylinder by its inherent elasticity and is shaped in such a way that when the hydraulic piston is displaced in the direction of actuation it detaches from the hydraulic cylinder, and when the hydraulic cylinder is displaced in the relief direction it bears on the hydraulic cylinder. The sealing ring thus acts as a check valve that opens when the hydraulic piston moves in the direction of actuation and that closes when there is a movement in the opposite direction. In this way, with simple means it is achieved that the movement of the hydraulic piston in the relief direction is dampened and in the direction of actuation is not impaired. In this way, the user is given the pedal feeling of a conventional brake system having a vacuum brake booster, even if the brake system has for example an electromechanical or electrohydraulic brake booster instead of a vacuum brake booster. In addition, due to the elastically deformable sealing ring that is fastened on the hydraulic piston and is thus movable with the hydraulic piston, an additional sleeve is no longer required and a compact realization of the master brake cylinder is possible.

According to a preferred specific embodiment of the present invention, it is provided that the sealing ring has a U-shaped or V-shaped cross-section. Through the U-shape or V-shape, the sealing ring is given a simple shape in order to form the check valve. The cross-section of the sealing ring is then realized such that the inner limb is connected to the hydraulic piston and the outer limb is oriented toward the hydraulic cylinder, or toward the inner wall of the hydraulic cylinder, the closed side of the sealing ring pointing in the direction of actuation and the open side pointing in the direction of relief, so that when the piston is moved in the direction of relief the fluid pressing against the sealing ring further expands the sealing ring and as a result reinforces the radial seal between the sealing ring and the inner wall of the hydraulic cylinder. In this way, a damping chamber between the sealing ring, hydraulic piston, and the hydraulic cylinder is formed, or closed, when the hydraulic piston moves in the relief direction.

Preferably, the sealing ring is fastened on the hydraulic piston before the first lateral wall opening, seen in the direction of actuation. Thus, if the piston is moved in the direction of actuation, or the user/driver depresses the brake pedal, the sealing ring is situated before the lateral wall opening. The lateral wall opening thus opens into the damping chamber. If the actuating piston is moved in the relief direction, the fluid held in the damping chamber can thus move through the lateral wall opening into the inner chamber of the hydraulic piston and thus escape from the damping chamber. In this way, the cross-section of the lateral wall opening determines the damping effect of the damping chamber.

In addition, it is preferably provided that the first lateral wall opening opens into a chamber in the hydraulic piston that has at least one second lateral wall opening axially at a distance from a first lateral wall opening, such that in at least one sliding position of the hydraulic piston the second lateral wall opening is connected to a relief chamber of the hydraulic cylinder. In this way, in a predetermined sliding position of the hydraulic piston, a hydraulic connection from the damping chamber to the relief chamber is created or interrupted. In this way, the damping effect of the master brake cylinder can be set in an advantageous manner by selecting the position of the lateral wall opening such that the desired damping characteristic results.

In particular, it is provided that the second lateral wall opening is situated in the hydraulic cylinder in such a way that the connection to the relief chamber arises only when the hydraulic piston is positioned close to its end position in the relief direction. In this way, the acceleration movement of the hydraulic piston is limited or reduced only at a late point, so that a rapid release or a rapid reduction of the brake pressure is possible on the one hand, and on the other hand a high impact speed of the hydraulic piston against an end stop of the hydraulic cylinder is prevented when there is relief of the brake pedal.

In addition, it is preferably provided that the first lateral wall opening is closed by the hydraulic cylinder in or shortly before the end position of the hydraulic piston. In this way, in the last movement region of the hydraulic piston, before its impact against the end stop of the hydraulic cylinder, the damping in the chamber is maximized in order to further brake the hydraulic piston. In this way, in particular an impact noise of the hydraulic piston is prevented.

In addition, it is preferably provided that the hydraulic piston is made free of steps, at least with its longitudinal segment situated inside the hydraulic cylinder. In this way, a simple design of the hydraulic cylinder is also ensured that is advantageous with regard to production costs. In addition, the installation can be carried out easily.

Preferably, the hydraulic piston has at least one circumferential annular groove in which the sealing ring lies in some regions. Through the circumferential annular groove, the sealing ring is fastened, or can be fastened, with a positive fit on the hydraulic piston in the axial direction so that an easy carrying along of the sealing ring is ensured when there is a movement of the hydraulic piston. In addition, the sealing ring can be clamped, caulked, welded, glued, or screwed onto the hydraulic piston in order to reliably prevent the sealing ring from detaching even when there are high loads.

The brake system according to the present invention is distinguished by the design according to the present invention of the master brake cylinder. In this way, the advantages named above result.

BRIEF DESCRIPTION OF THE DRAWINGS

FIG. 2 shows a simplified detail view of a master brake cylinder of the brake system in longitudinal section.

DETAILED DESCRIPTION

Figure 1:
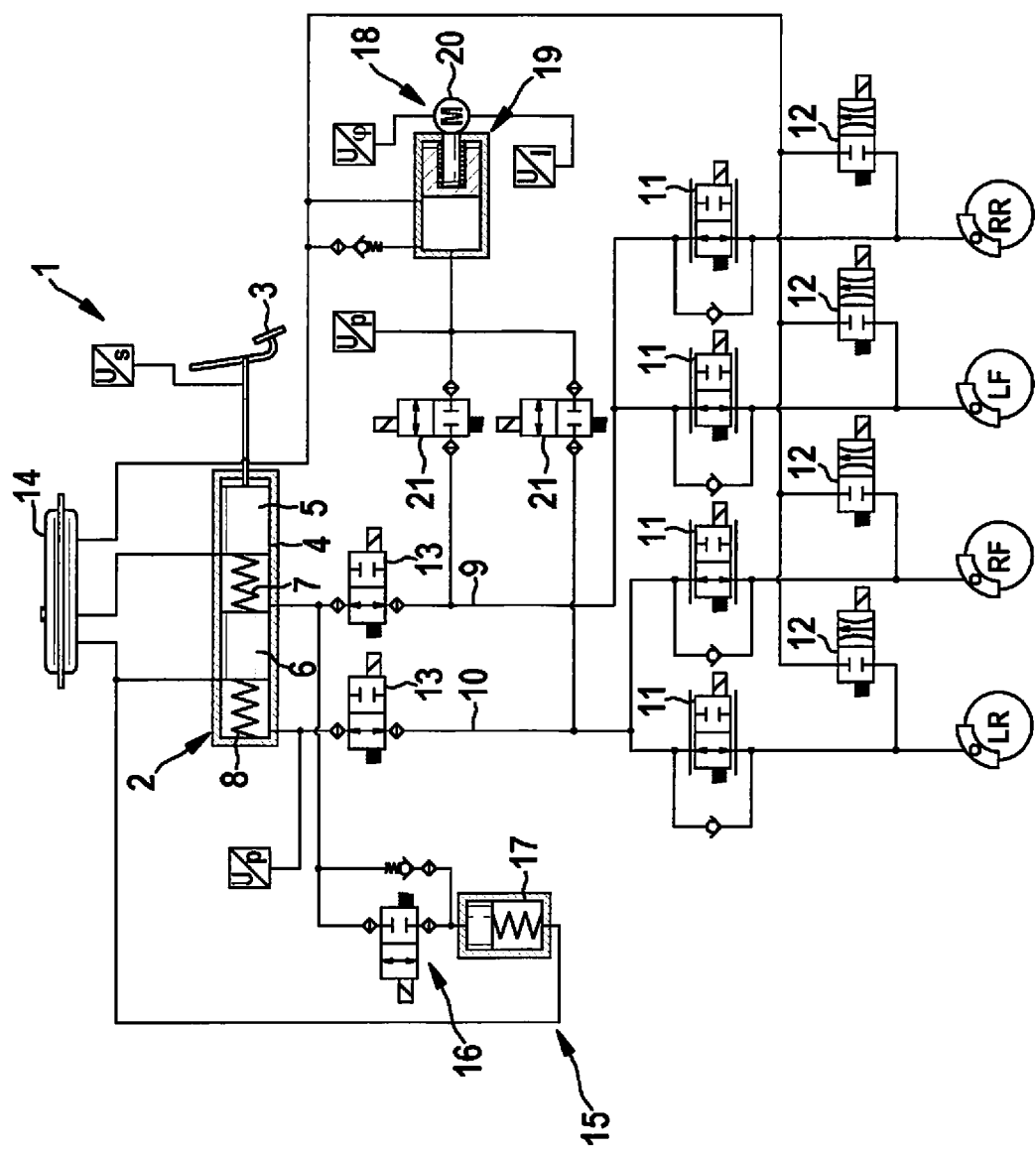
FIG. 1 shows a brake system of a motor vehicle in a simplified representation.

FIG. 1 shows, in a simplified representation, a brake system 1 for a motor vehicle (not shown in more detail). Brake system 1 has a master brake cylinder 2 that is realized as a tandem cylinder and can be actuated by a driver of the motor vehicle via a brake pedal 3. Master brake cylinder 2 has a hydraulic cylinder 4 in which a hydraulic piston 5, connected mechanically fixedly to brake pedal 3, and a further hydraulic piston 6 are each mounted so as to be axially displaceable. Between hydraulic piston 5 and further hydraulic piston 6 there is situated a spring element 7, and between further hydraulic piston 6 and an end face of hydraulic cylinder 4 there is situated a further spring element 8, axially preloaded, so that chambers that communicate with hydraulic connections of brake system 1 are formed respectively between hydraulic pistons 5 and 6 in hydraulic cylinder 4. In particular, two brake circuits 9 and 10 are connected to master brake cylinder 2 by the hydraulic connections in such a way that one of the brake circuits 9 is fluidically connected to one of the hydraulic chambers and the other brake circuit 10 is fluidically connected to the other hydraulic chamber. In this way, the two brake circuits 9, 10 can both be operated by master brake cylinder 2.

The two brake circuits 9 and 10 are constructed essentially identically to one another. Each brake circuit 9, 10 has two wheel brakes LR, RF, or LF, RR, that are actuatable by inlet valves 11 and outlet valves 12 in the respective brake circuit 9, 10. Brake circuits 9, 10 can each be connected to one of the chambers of master brake cylinder 2 by high-pressure switching valves 13.

In a tank that is also connected to master brake cylinder 2, a fluid, or brake fluid, is held that can be impelled into brake circuits 9, 10 by actuating master brake cylinder 2.

In the present brake system 1, a brake booster is not provided. For this reason, brake pedal 3 is also mechanically directly connected to hydraulic piston 5. In order to nonetheless provide the driver with the accustomed pedal feel, brake system 1 also has a brake pedal feel simulator 15 that has a switching valve 16 and a pressure storage unit 17. Brake pedal feel simulator 15 is used to influence the pedal movement of brake pedal 3 in such a way that it matches, or nearly matches, the pedal movement of a brake pedal that is connected to a vacuum booster. In this way, the driver is provided with the familiar brake pedal feeling.

According to the present exemplary embodiment, a brake boosting takes place through an electromechanical brake booster 18 that has a pump 19, in the present case a piston pump, that can be driven by an electric motor 20 in order to increase a hydraulic pressure in brake circuits 9, 10 as needed. For this purpose, brake circuits 9, 10 are connected to brake booster 18 by a respective switching valve 21.

FIG. 2 shows, in a simplified detailed view, master brake cylinder 2 in a longitudinal section. Hydraulic piston 5, mechanically connected to brake pedal 3, is guided radially only in some regions on hydraulic cylinder 4. For this purpose, hydraulic cylinder 4 has on its end face a tapered guide segment 23 in which hydraulic piston 5 is guided radially tightly. In guide segment 23, hydraulic cylinder 4 has an annular first radial receptacle 24 in which an elastically deformable sealing element 25 is held that extends in annular fashion around hydraulic piston 5 and is held axially in radial receptacle 24 so that it forms a radial seal for hydraulic piston 5. At a distance from annular radial receptacle 24, a further annular receptacle recess 26 is formed in which a further sealing element 27 is situated that, like sealing element 25, acts in radially sealing fashion between hydraulic piston 5 and hydraulic cylinder 4. Between the two sealing elements 25, 27, hydraulic cylinder 4 has a hydraulic connection 28 that leads to hydraulic piston 5 and that is closed by hydraulic piston 5 in the initial position as shown in FIG. 2.

Hydraulic piston 5 itself has an inner chamber 29 that is fashioned essentially coaxial to hydraulic piston 5 and that is assigned to the end of hydraulic piston 5 extending into hydraulic cylinder 4. Two lateral wall openings 30 and 31 are assigned to chamber 29. Lateral wall openings 30, 31 are axially at a distance from one another, the distance being selected such that, as shown in FIG. 2, a fluid connection can be produced between the inner chamber of master brake cylinder 4 and the receptacle chamber 26 and/or hydraulic connection 28.

At its free end extending into the inner chamber of hydraulic cylinder 4, hydraulic piston 5 also has a sealing ring 32. Sealing ring 32 is fastened on its inner side on hydraulic piston 5 in a circumferential annular groove 34, and on its outer side lies against the inner side or inner wall 33 of hydraulic cylinder 4. Sealing ring 32 extends over the entire circumference of hydraulic piston 5 and is fashioned as a check valve. For this purpose, sealing ring 32 has in the present case a U-shaped cross-section by which the pressure force against hydraulic cylinder 4 is reduced when hydraulic piston 5 is pushed into hydraulic cylinder 4 in the direction of actuation, as indicated by an arrow 35, and the pressure force is increased when hydraulic cylinder 4 is drawn out from hydraulic cylinder 4 in the opposite direction, i.e. in the relief direction. Sealing ring 32 forms a damping chamber 36 together with the hydraulic cylinder and hydraulic piston 5. When hydraulic piston 5 is moved in the relief direction, a hydraulic pressure prevailing in damping chamber 36 causes sealing ring 32 to be further pressed against hydraulic cylinder 4. In this way, the fluid is forced to flow through lateral wall opening 30 into inner chamber 29 and from inner chamber 29 into receptacle chamber 26, or subsequently into hydraulic connection 28. To this extent, receptacle chamber 26 is a relief chamber that is released as soon as lateral wall opening 31 is situated in the region of receptacle chamber 26.

Through this simple design of master brake cylinder 2, it is brought about that hydraulic piston 5 is prevented, or damped, from making a rapid movement in the relief direction. The spring force of spring element 7 acting on hydraulic piston 5 and the hydraulic pressure acting on hydraulic piston 5, which is set by pedal feel simulator 15, automatically presses piston 5 in the relief direction as soon as the driver removes his foot from brake pedal 3. Through the advantageous damping, it is achieved that pedal 3 and/or hydraulic piston 5 do not simply collide with an end stop, and a rebounding or oscillating movement of brake pedal 3 is also prevented. The final speed of hydraulic piston 5 is thus limited by the advantageous damping.

What is claimed is:

1. A master brake cylinder for a brake system of a motor vehicle, comprising:
    a hydraulic cylinder that includes a plurality of hydraulic connections;
    a spring element;
    an elastically deformable sealing ring; and
    a hydraulic piston mounted in at least one of the hydraulic connections so as to be displaceable axially in an actuation direction and in a relief direction into a plurality of sliding positions;
    wherein:
        the hydraulic piston is displaceable in the actuation direction against a force of the spring element;
        the hydraulic piston includes at least one lateral wall opening that, in at least one of the sliding positions, provides a hydraulic connection into an inner chamber of the hydraulic cylinder;
        an inner side of the elastically deformable sealing ring is fastened on the hydraulic piston;
        an outer side of the elastically deformable sealing ring is preloaded against the hydraulic cylinder by an inherent elasticity of the elastically deformable sealing ring;
        in at least one of the plurality of sliding positions, the hydraulic cylinder, the hydraulic piston, and the sealing ring are arranged relative to each other in a manner that forms a damping chamber, with the sealing ring separating the damping chamber and the inner chamber from each other, the inner chamber being, relative to the actuation direction, at a downstream side of the sealing ring and the damping chamber being, relative to the actuation direction, at an upstream side of the sealing ring;
        displacement of the hydraulic piston in the actuation direction reduces a volume of the inner chamber and enlarges a volume of the damping chamber, which causes the elastically deformable sealing ring to detach from the hydraulic cylinder; and
        displacement of the hydraulic piston in the relief direction enlarges the volume of the inner chamber and reduces the volume of the damping chamber, which causes the elastically deformable sealing ring to bear on the hydraulic cylinder.

2. The master brake cylinder as recited in claim 1, wherein the sealing ring has one of a U-shaped cross-section and a V-shaped cross-section.

3. The master brake cylinder as recited in claim 1, wherein the at least one lateral wall opening includes a first lateral wall opening, and the elastically deformable sealing ring is fastened on the hydraulic piston in front of the first lateral wall opening, seen in the direction of actuation.

4. The master brake cylinder as recited in claim 3, wherein the at least one lateral wall opening additionally includes a second lateral wall opening, the first lateral wall opening opens into a portion of the inner chamber that is in the hydraulic piston into which the second lateral wall opening also opens, and the second lateral wall opening is at an axial distance from the first lateral wall opening, such that, in at least one of the sliding positions of the hydraulic piston, the second lateral wall opening is connected to a relief chamber of the hydraulic cylinder.

5. The master brake cylinder as recited in claim 4, wherein the second lateral wall opening is situated in the hydraulic piston in such a way that the connection to the relief chamber does not arise until the hydraulic piston is in a position close to an end position of the hydraulic piston in the relief direction.

6. The master brake cylinder as recited in claim 3, wherein the first lateral wall opening is closed by the hydraulic cylinder in or shortly before an end position of the hydraulic piston.

7. The master brake cylinder as recited in claim 1, wherein the hydraulic piston is made without steps at least on a longitudinal segment situated inside the hydraulic cylinder.

8. The master brake cylinder as recited in claim 1, wherein the hydraulic piston has at least one circumferential annular groove in which the elastically deformable sealing ring lies in some regions.

9. A brake system for a motor vehicle, comprising:
    at least one hydraulic circuit that has at least one hydraulically actuatable wheel brake; and
    a master brake cylinder that is connected to the at least one hydraulic circuit, wherein the master brake cylinder includes:
        a hydraulic cylinder;
        a spring element;

an elastically deformable sealing ring; and
a hydraulic piston mounted in at least one of the hydraulic connections so as to be displaceable axially in an actuation direction and in a relief direction into a plurality of sliding positions;

wherein:
the hydraulic piston is displaceable in the actuation direction against a force of the spring element;
the hydraulic piston includes at least one lateral wall opening that, in at least one of the sliding positions, provides a hydraulic connection into an inner chamber of the hydraulic cylinder;
an inner side of the elastically deformable sealing ring is fastened on the hydraulic piston;
an outer side of the elastically deformable sealing ring is preloaded against the hydraulic cylinder by an inherent elasticity of the elastically deformable sealing ring;
in at least one of the plurality of sliding positions, the hydraulic cylinder, the hydraulic piston, and the sealing ring are arranged relative to each other in a manner that forms a damping chamber, with the sealing ring separating the damping chamber and the inner chamber from each other, the inner chamber being, relative to the actuation direction, at a downstream side of the sealing ring and the damping chamber being, relative to the actuation direction, at an upstream side of the sealing ring;
displacement of the hydraulic piston in the actuation direction reduces a volume of the inner chamber and enlarges a volume of the damping chamber, which causes the elastically deformable sealing ring to detach from the hydraulic cylinder; and
displacement of the hydraulic piston in the relief direction enlarges the volume of the inner chamber and reduces the volume of the damping chamber, which causes the elastically deformable sealing ring to bear on the hydraulic cylinder.

10. A master brake cylinder for a brake system of a motor vehicle, comprising:
a hydraulic cylinder;
a spring;
an elastically deformable sealing ring; and
a hydraulic piston mounted in the hydraulic cylinder so as to be displaceable axially in an actuation direction against a force of the spring and to be displaceable axially in an opposite relief direction;

wherein:
the hydraulic piston includes at least one lateral wall opening that, in at least one axial position of the hydraulic piston, provides a hydraulic connection into an inner chamber of the hydraulic cylinder;
an inner side of the elastically deformable sealing ring is fastened on the hydraulic piston;
an outer side of the elastically deformable sealing ring is preloaded against the hydraulic cylinder by an inherent elasticity of the elastically deformable sealing ring; and
the elastically deformable sealing ring is shaped such that, when there is a displacement of the hydraulic piston in the actuation direction, the elastically deformable sealing ring detaches from the hydraulic cylinder and, when there is a displacement of the hydraulic piston in the relief direction, the elastically deformable sealing ring bears on the hydraulic cylinder;

one of the at least one lateral wall opening:
opens into a portion of the inner chamber of the hydraulic cylinder partly bounded by the elastically deformable sealing ring when the hydraulic piston is in the at least one axial position; and
cannot open into the portion of the inner chamber of the hydraulic cylinder partly bounded by the elastically deformable sealing ring when the hydraulic piston is not in the at least one of axial position; and wherein one or more of the following five features (1)-(5):
(1) the displacement of the hydraulic piston in the actuation direction shifts the elastically deformable sealing ring from a first sealing ring position to a second sealing ring position, and at least one of the following features (i) and (ii):
  (i) when the elastically deformable sealing ring is in the first sealing ring position, the elastically deformable sealing ring abuts against a surface of the hydraulic cylinder against which the elastically deformable sealing ring cannot abut whenever the elastically deformable sealing ring is in the second sealing ring position; and
  (ii) (a) when the elastically deformable sealing ring is in the first sealing ring position, a particular part of the elastically deformable sealing ring abuts against the hydraulic cylinder, and (b) whenever the elastically deformable sealing ring is in the second sealing ring position, the particular part of the elastically deformable sealing ring cannot abut against the hydraulic cylinder;
(2) the preload of the elastically deformable sealing ring against the hydraulic cylinder (a) is of a surface of the elastically deformable sealing ring that faces in the relief direction and (b) is against a surface of the hydraulic cylinder that faces in the actuation direction;
(3) the displacement of the hydraulic piston in the actuation direction shifts one of the at least one lateral wall opening from a first piston position at which the one of the at least one lateral wall opening does not provide the hydraulic connection to the inner chamber to a second piston position at which the one of the at least one lateral wall opening provides the hydraulic connection to the inner chamber;
(4) the at least one lateral wall opening includes at least two lateral wall openings; and
(5) in at least one of the axial positions of the hydraulic piston, the hydraulic cylinder closes one or more of the at least one lateral wall opening.

11. The master brake cylinder as recited in claim 10, wherein:
the displacement of the hydraulic piston in the actuation direction shifts the elastically deformable sealing ring from the first sealing ring position to the second sealing ring position; and
when the elastically deformable sealing ring is in the first sealing ring position, the elastically deformable sealing ring abuts against the surface of the hydraulic cylinder against which the elastically deformable sealing ring cannot abut whenever the elastically deformable sealing ring is in the second sealing ring position.

12. The master brake cylinder as recited in claim 10, wherein:

the displacement of the hydraulic piston in the actuation direction shifts the elastically deformable sealing ring from the first sealing ring position to the second sealing ring position;

when the elastically deformable sealing ring is in the first sealing ring position, the particular part of the elastically deformable sealing ring abuts against the hydraulic cylinder; and whenever the elastically deformable sealing ring is in the second sealing ring position, the particular part of the elastically deformable sealing ring cannot abut against the hydraulic cylinder.

13. The master brake cylinder as recited in claim 10, wherein the preload of the elastically deformable sealing ring against the hydraulic cylinder (a) is of the surface of the elastically deformable sealing ring that faces in the relief direction and (b) is against the surface of the hydraulic cylinder that faces in the actuation direction.

14. The master brake cylinder as recited in claim 10, the displacement of the hydraulic piston in the actuation direction shifts the one of the at least one lateral wall opening from the first piston position at which the one of the at least one lateral wall opening does not provide the hydraulic connection to the inner chamber to the second piston position at which the one of the at least one lateral wall opening provides the hydraulic connection to the inner chamber.

15. The master brake cylinder as recited in claim 10, wherein the at least one lateral wall opening includes at least two lateral wall openings.

16. The master brake cylinder as recited in claim 10, wherein, in the at least one of the axial positions of the hydraulic piston, the hydraulic cylinder closes the one or more of the at least one lateral wall opening.

* * * * *